United States Patent [19]
Fearon

[11] 3,754,226
[45] Aug. 21, 1973

[54] CONDUCTIVE-RING FERROMAGNETIC MARKER AND METHOD AND SYSTEM FOR USING SAME

[75] Inventor: Edward R. Fearon, Tulsa, Okla.

[73] Assignee: Stoplifter International Inc., Dallas, Tex.

[22] Filed: Nov. 24, 1971

[21] Appl. No.: 201,858

Related U.S. Application Data

[60] Division of Ser. No. 747,050, March 22, 1968, Pat. No. 3,631,442, which is a continuation-in-part of Ser. No. 680,666, Nov. 6, 1967, abandoned.

[52] U.S. Cl. ............... 340/280, 325/8, 340/258 R, 343/6.5 SS, 343/6.8, 343/787, 343/788
[51] Int. Cl. ............................................ G08b 13/24
[58] Field of Search .................. 340/258 R, 258 C, 340/280, 224; 325/8, 105; 343/6.5 SS, 6.8, 787, 788; 179/82

[56] References Cited
UNITED STATES PATENTS

| | | | |
|---|---|---|---|
| 2,774,060 | 12/1956 | Thompson | 340/258 R |
| 3,098,971 | 7/1963 | Richardson | 325/8 X |
| 3,218,638 | 11/1965 | Honig | 343/6.5 SS |
| 3,384,892 | 5/1968 | Postman | 343/6.5 SS |

*Primary Examiner*—David L. Trafton
*Attorney*—D. Carl Richards, Jerry W. Mills et al.

[57] ABSTRACT

A ferromagnetic marker is used in tagging objects to allow selective detection of the tagged objects within an interrogation zone having a magnetic field varying at a fundamental frequency. The marker comprises a ring-shaped electrical conductor for carrying a current induced by the varying magnetic field. An element which is non-linearly polarized in response to an electromagnetic field is disposed proximate the conductor to modulate the current flowing therethrough. A modulated electromagnetic signal is then generated and sensed to allow detection of a tagged object.

13 Claims, 9 Drawing Figures

FIG. I

CONDUCTIVE-RING FERROMAGNETIC MARKER AND METHOD AND SYSTEM FOR USING SAME

CROSS REFERENCE TO RELATED APPLICATIONS

This application is a divisional application of U.S. Pat. application Ser. No. 747,050, filed Mar. 22, 1968, now U.S. Pat. No. 3,631,442, which was filed as a continuation-in-part of now abandoned patent application Ser. No. 680,666 filed Nov. 6, 1967.

FIELD OF THE INVENTION

This invention relates to a marker and a method and system for detecting the marker for preventing unauthorized removal of objects having the marker attached thereto.

DESCRIPTION OF THE PRIOR ART

There are in existence several systems for detecting or preventing the theft of articles of value. One of these corresponding with U.S. Pat. No. 3,292,080, granted to E. M. Trikilis, Dec. 13, 1966, makes use of a magnetometer and utilizes a magnetized object which identifies the article unless checkout procedure has removed the magnetism from the object. The magnetized object is attached to or becomes a part of the merchandise or article of value, and by energizing the magnetometer system as it passes through the doorway, is detected. If the magnetized object has been demagnetized it causes no magnetic signal as it passes through the doorway and is not detected. Demagnetizing is done in the process of checking out the merchandise. Thus by the checkout procedure an individual has free passage with the merchandise that has been paid for or recorded by the clerk. Any additional merchandise not paid for and however concealed radiates a magnetic influence, and energizes the magnetometer at the doorway, creating an awareness of security department personnel that something is being stolen.

Another system involves radioactive material which emits nuclear radiation. When the label containing the magnetic material is removed from the merchandise, the radiation is no longer emitted, and therefore radiation detectors situated in the doorway are not energized. On the other hand, if the radiation emitters remain on the merchandise, doorway sensors of nuclear radiation react, and security personnel are in a position to prevent the theft.

In another system currently being employed in a men's wear department in Macy's in New York City, the operator uses a radio frequency generating device embedded in a rubber pad. The radio frequency emitting device is fastened to the men's clothing, and if not removed, will energize radio frequency detecting antennas at the doorway. In the normal course of events, when the merchandise is sold, a special fastener is unlocked and the radio frequency emitter is removed from the clothing at the time it is sold, permitting the buyer to pass through the doorway without attracting the attention of the store detective.

All of the foregoing systems have severe difficulties of one kind or another. The Trikilis system unfortunately requires a rather large piece of ferromagnetic material for the marking of the merchandise. If too small a piece of ferromagnetic material is used, ambient variations in the magnetic field are greater than the changes caused by the Trikilis merchandise marker. In the case of the radioactive dot, there is a severe health problem involving danger to people from the nuclear radiation, and involving danger to those who remove the markers and store them. The system in use in Macy's Store unfortunately is limited by the extreme costliness of the radio frequency transmitter, and the limited period of time during which its emission can be maintained by the little batteries with which it is provided. True, larger radio frequency emitting pads could be made, but these tear or injure the clothing, and are impractically bulky.

SUMMARY OF THE INVENTION

I have discovered a practical solution to the problems presented but not solved by the workers in the prior art as described above. As a matter of convenience, I choose to employ electromagnetic radiation. However, because of the inconvenience of supplying energy in a contraband marking, the energy to be radiated from the contraband marked device is delivered, instead, from structural members of my sensing doorway.

I have found it extremely difficult to re-radiate or reflect energy in a distinctive manner from any merchandise marker for the reason that all solid bodies and all electrically conductive masses (including the human body which is largely composed of salt water) also reflect or disperse electromagnetic radiation and therefore must be considered in the recognition of any merchandise marking. A human being reflects more electromagnetic energy than any practical size of merchandise marker.

I have solved the problems just described by my discovery of an extremely simple device which can receive energy and re-emit it, receiving the energy in a frequency spectrum entirely distinct from the frequency spectrum which is re-emitted. I do this by making use of the properties of electrically and electromagnetically nonlinear systems. In general, it is the property of a nonlinear system that if a frequency F is imposed at an energy level at which the nonlinearity of the system becomes important, the system will generate frequencies 2F, 3F, 4F, etc. Similarly, if I impose on a nonlinear system signal sources which deliver approximately equal energy in each of two frequencies, the nonlinear system will generate other frequencies, not originally present. If the frequencies which I impose are $F_1$ and $F_2$, the nonlinear system will generate signals having frequencies $F_1 + F_2$, $F_1 - F_2$, $F_1 + 2F_2$, $2F_1 + 2F_2$, and various other combinations of sums and differences of multiples of the frequencies which I impose.

In further accordance with the invention, a marker is disclosed which when secured to an object enables detection of the object when the object is in an oscillating electromagnetic field of an interrogation zone, such as a doorway, by radiating detectable electromagnetic radiation in response to energy received from the oscillating electromagnetic field. The marker includes a ring-shaped electrical conductor for carrying a current induced in the conductor by an electromagnetic field the lines of flux of which link the conductor. The marker also includes a substance which is nonlinearly polarized in response to an electromagnetic field and which is proximate to the conductor to modulate the current flowing in the conductor according to the polarization of the substance when an electromagnetic field is inducing a current in the conductor and polarizing the substance. The marker then radiates detectable electromagnetic radiation at a predetermined modulation of the oscillating electromagnetic field.

In accordance with another aspect of the invention, a system is provided for detecting an object in an interrogation zone. The system includes means proximate the area for concurrently producing at least one oscillating electromagnetic field in the zone. A marker is associated with each object to be detected for radiating detectable electromagnetic radiation in response to energy received from the oscillating electromagnetic field, the marker comprising a ring-shaped electrical conductor for carrying a current induced in the conductor by an electromagnetic field, the lines of flux of which link the conductor. The marker further includes a substance which is non-linearly polarized in response to an electromagnetic field and which is proximate to the conductor to modulate the current flowing in the conductor according to the polarization of the substance when an electromagnetic field is inducing a current in the conductor and polarizing the substance. The marker thus radiates detectable electromagnetic radiation at a predetermined modulation of the oscillating electromagnetic field. Means is also provided for sensing in the interrogation zone electromagnetic radiation having the predetermined modulation.

DESCRIPTION OF THE PREFERRED EMBODIMENTS

Figure 1:
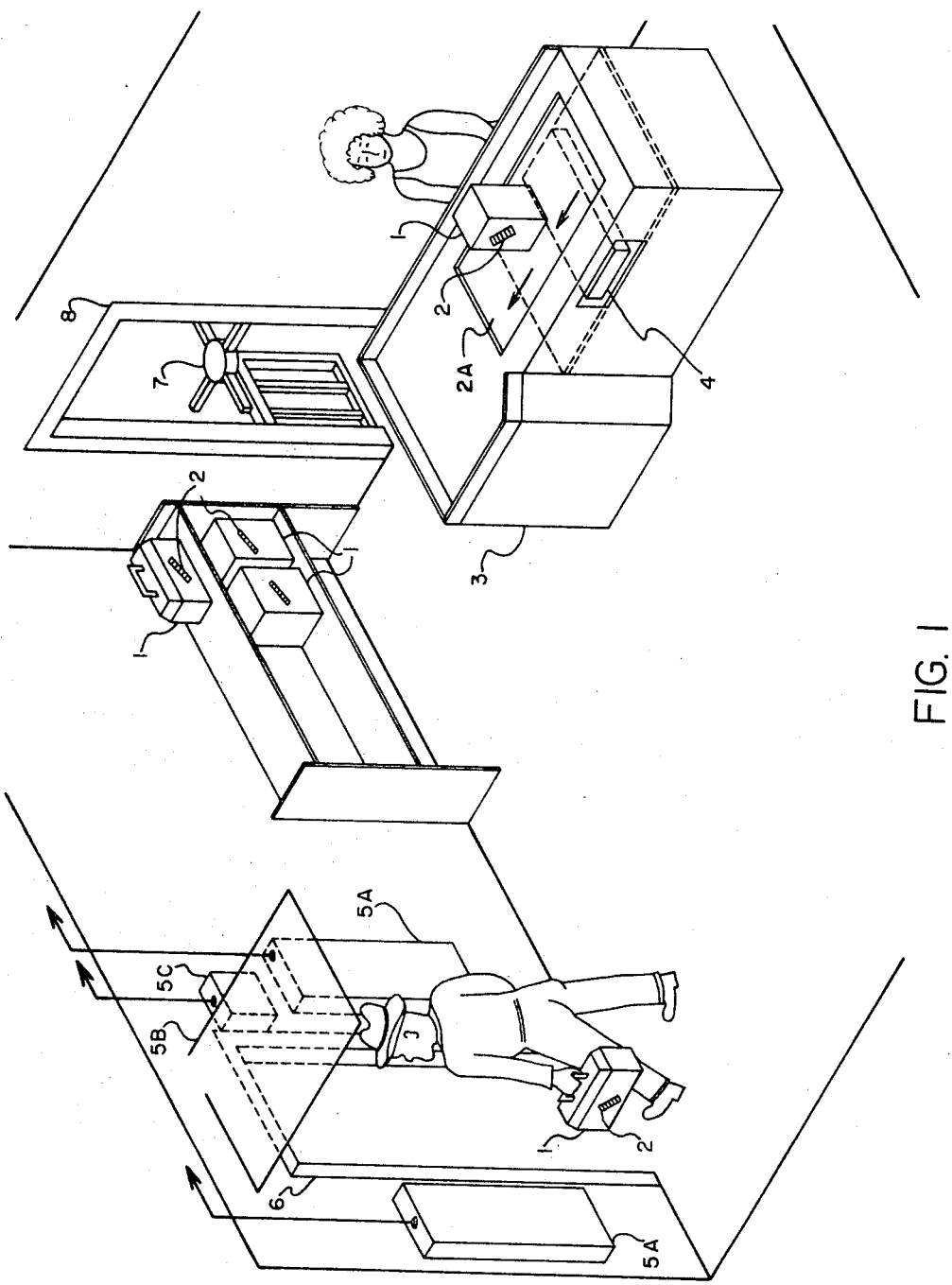
FIG. 1 shows a somewhat diagrammatic view of a typical installation of the present system.

I now turn to FIG. 1 which is a general view of the manner in which my system operates in a store to prevent theft of merchandise. Merchandise 1 is provided with contraband marker elements 2. The checkout stand area 3 contains a deactivating device 4 which is capable of changing the electromagnetic properties of the contraband marker elements 2. An energizing and detecting system 5A situated in the 5B and 5C vicinity of the outgoing doorway 6 detects the contraband marker elements 2, and identfies those which have not been subjected to change at the checkout stand area 3 by the deactivating device 4. In the use of my system, one way traffic, enforced by perphaps a turnstile 7, takes care of persons entering the store, prohibiting the carrying of merchandise from the store to areas outside the store except through my outgoing doorway 6. The turnstile 7 is provided at the entry portal 8.

Figure 2:
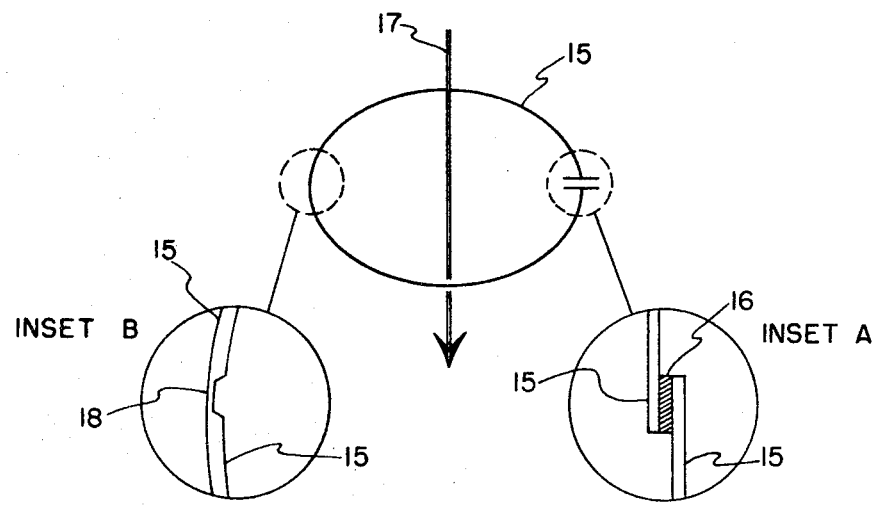
FIG. 2 is a view of a preferred embodiment of the conductive-ring marker of the invention.

I turn now to FIG. 2 in which there is illustrated an electromagnetically functionable nonlinear marker device for use in the system shown in FIG. 1. The ring-shaped conductor 15 may be made, if desired, of a flat piece of metal, or if desired, may be composed of a wire. In any event the ends of the ring-shaped conductor 15 do not join, but (as shown in inset A) are separated by a space filled with substance such as barium titanate 16. The barium titanate filled space 16 is preferably of appreciable area and thin. As is well known, the electrical polarization of the barium titanate 16 is a nonlinear function of the electric field acting on it. Accordingly therefore, the assembly shown in FIG. 2 radiates energy at frequencies other than those imposed on it when it is energized by a magnetic vector 17 corresponding with a cyclical variation of magnetic intensity in the direction indicated. If a single frequency F is imposed as a result of induction from the electromagnetic induction in the ring-shaped electrical conductor 15, the frequencies which are generated as a result, and which may therefore be radiated, are $2F$, $3F$, $4F$, and so on. If the magnetic vector 17 comprises electromagnetic energy at two frequencies $F_1$ and $F_2$, and, particularly, if these are of approximately equal intensity, the nonlinear behavior of the barium titanate layer 16 results in the generation of frequencies such as $F_1 + F_2$, $F_1 - F_2$, $2F_1 + F_2$, $F_1 + 2F_2$, and various other combinations of sums and differences of multiples of the frequencies $F_1$ and $F_2$.

The contraband marker element 2 (FIG. 1) may be composed of the structure such as I have described in my FIG. 2. In the previous description of FIG. 2, I have recited only the essential components, those which pertain to its electrical and signal inducing behavior, by which it serves to identify merchandise 1 (FIG. 1) that is stolen. A checkout stand deactivating arrangement can be employed in the general manner shown at reference numeral 4 in FIG. 1. In the use of the contraband marker element 2 of the type set out in FIG. 2, the deactiviating device 4 (FIG. 1) comprises an electromagnetic energy source which radiates, at least sometimes, electromagnetic energy corresponding with the frequency of mechanical resonance of the barium titanate mass 16 and the nearby portions of the attached metal ring-shaped conductor 15. In this form of dactivation, the energy of mechanical vibration induced by the deactivating device 4 (FIG. 1) fractures the barium titanate mass 16, thus destroying or noticably changing the behavior of this type of electromagnetic marker. By this change I can recognize that the contraband marker element 2 (FIG. 1) was deactivated, and therefore determine that the attached merchandise 1 (FIG. 1) was sold.

Another technique of deactivation which may be employed in connection with the FIG. 2 device makes use of the constriction of the ring-shaped conductor 15 at the point 18 as shown in the inset B. In deactivating, I may, if I choose, make use of this constriction 18 by inducing on the ring-shaped conductor 15 enough current to melt or destroy the electrically conducting material present at the constriction 18. If it is desired to make the constriction 18 sensitive and easily destroyed, the material present in the constriction 18 may, in fact, be composed of a substance or substances less well adapted to conduct electricity than is the main portion of the ring-shaped conductor 15. By such a choice, heat or other alteration will occur readily at the constriction 18 causing the circuit involving the ring-shaped conductor 15 and the barium titanate mass 16 to open up with the result that the contraband marker element 2

(FIG. 1) will no longer function to produce summation and difference frequencies, and therefore is not detected by the energizing and detecting system 5 (FIG. 1) of the outgoing doorway 6 of FIG. 1.

Figure 3:
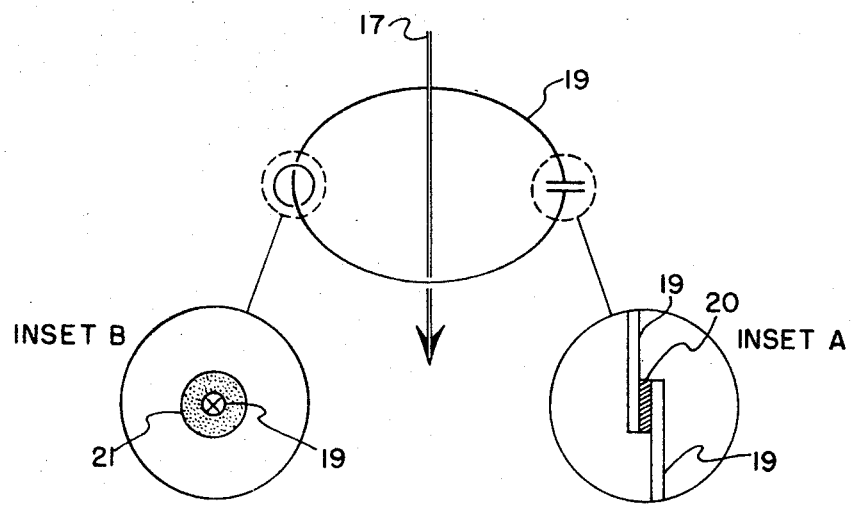
FIG. 3 is a view of a variation of the marker shown in FIG. 2.

I turn now to FIG. 3, in which I illustrate a further variation of contraband marker element 2 (FIG. 1). In inset A of FIG. 3 I show a conductor 19 and a mass of barium titanate 20 at a separation between the ends of the conductor 19, as shown in inset B. In addition, a quantity of ferromagnetic material 21 (shown in an inset B) is disposed in such a manner that it closes a magnetic circuit surrounding the current flowing in the conductor 19 in a manner to substantially increase the inductance exhibited by the one turn loop of the conductor 19. As a result of the use of ferromagnetic material 21 and because of the relatively large electrical capacity of the gap containing the barium titanate 20 (as compared with a gap containing ordinary dielectric) the system illustrated in this figure is, in fact, and inductance and capacitance loop which, because of the ordinary considerations of communications engineering has a resonance frequency of:

$$F = (1.592 \times 10^5) \text{Hertz}/ \sqrt{LC}$$

where $L$ is inductance in microhenries
$C$ is capacitance in microfarads

In view of the presence of the ferromagnetic material, the above described resonance is not as sharp as resonances of air core coils containing large amounts of electrically conductive material but containing no ferromagnetic material. For the reason that the resonance of system described in FIG. 3 has an appreciable width, I can, if I choose, energize it with more than one frequency, the said frequencies differing appreciably, and yet expect that both frequencies will lie substantially within the resonance. The operation of my system as set out in FIG. 1, employing contraband marker elements 2 (FIG. 1) but of the special type provided in FIG. 3 works in a manner generally similar to the description I have given in my discussion of the operation of my system with the contraband marker element of FIG. 2, but will require that the energy sources at the energizing and detecting systems 5 (FIG. 1) of the outgoing doorway 6 (FIG. 1) supply frequencies falling within the capacity and inductance resonance of the system for the greatest efficiency of energy delivery to the marker. The vector arrow 17 through the center of the loop formed by the conductor 19 has exactly the same significance as the vector arrow 17 in FIG. 2.

Figure 4:
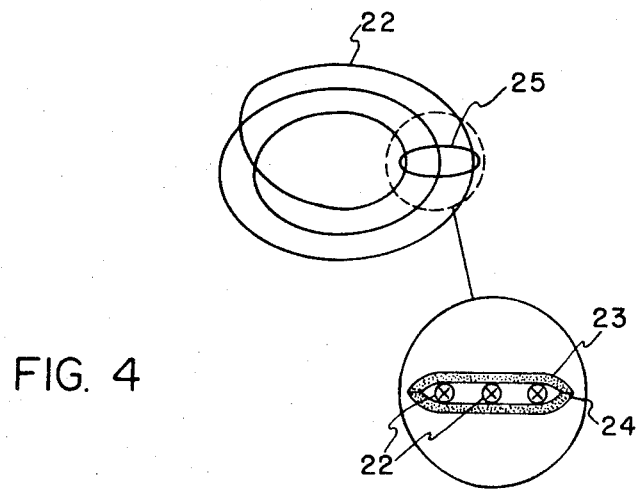
FIG. 4 is a view of another variation of the conductive-ring marker of the invention.

In FIG. 4 I illustrate a contraband marker comprising a flat coil of one or more turns short circuited on itself. An equivalent to the illustrated flat coil 22 would be, for instance, a copper washer occupying the same region of space, and having in it an amount of copper equal to the total amount contained in the wire of the illustrated coil 22. Ferromagnetic elements 23 and 24 (shown in the inset) are disposed to link the magnetic flux developed by the coil 22, and are chosen of material of extremely low magnetic coercive force. Additionally the ferromagnetic elements 23 and 24 are deliberately taken in a form having an insufficient amount of ferromagnetic material, creating a strong likelihood that magnetic saturation will occur. By the occurrence of magnetic saturation, which is a nonlinear process, the flux changes associated with the nonlinearity cause radiation from the electrically conducting loop 25. The frequencies so radiated correspond with modulation products, serving the same purposes as the modulation products developed in connection with the uses of my other contraband marker elements 2 (FIG. 1).

The ferromagnetic elements 23 and 24 are shown in a form adapted to serve the purpose of linking the magnetic flux induced in the presence of my short circuited coil 22, but do not have to be bent sharply to go around the flat coil 22. Instead I lay a piece 24 flatwise immediately below the flat coil 22 and another piece 23 similarly above it. The two pieces 23 and 24 approach each other very closely at their extremities, permitting the easy transfer of magnetic flux from one piece into the other, thus allowing the circulation of magnetic flux around the conductor. The marker element illustrated in FIG. 4 is not provided with any deactivation capabilities. Instead the user has to remove this type of marker labe from the merchandise at the time of sale. This marker element of FIG. 4 is described for the purpose of illustrating how a system not involving deactivation can be combined in my invention. In use, the energizing and detecting system 5 (FIG. 1) in the vicinity of the outgoing doorway 6 (FIG. 1) produces and detects from this contraband element (FIG. 4) a signal showing that the merchandise 1 (FIG. 1) being taken out still has the contraband marker element 2 (FIG. 1) on it. Merchandise from which the clerk has removed the contraband marker element of FIG. 4, of course, does not give this effect at the doorway.

Figure 5A:
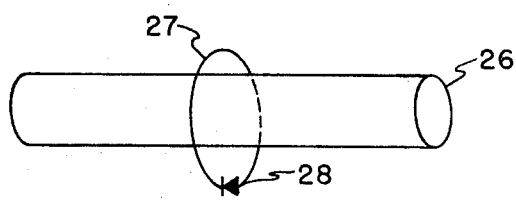
FIGS. 5A-5B illustrate additional variations of the conductive-ring markers of the invention.

In FIG. 5A, I show another type of contraband marker element corresponding with a longitudinally extending strip or rod of ferromagnetic material 26 capable of responding at the frequencies $F_1$ and $F_2$ delivered at my energizing and detecting system 5 (FIG. 1) in the vicinity of the outgoing doorway 6 (FIG. 1). Linking the equatorial region of the longitudinally extending ferromagnetic material 26 I provide an electrical conductor 27 which makes one or more turns around the equatorial region of the said ferromagnetic material 26. The terminations of the electrical conductor 27 are connected together through a nonlinear electric element 28 comprising a germanium rectifier junction, a copper oxide rectifier junction, a silicon rectifier junction, or suitable other more or less unilaterally electrically conducting arrangement. In use, the knee of the voltage versus current characteristic for the nonlinear elements represents a nonlinearity which imposes its effect on any current induced in or flowing through the electrical conductor 27. The nonlinear effect thus imposed reacts on the magnetic field in the ferromagnetic element 26 causing summation and difference frequencies to be magnetically radiated, as is the case with the contraband marker elements 2 (FIG. 1) previously described. The utilization of summation and difference frequencies is, in fact, the same. Deactivation is produced at the deactivating device 4 (FIG. 1) by inducing through the diode element 28 a large enough electrical current to destroy it. In the destroyed form, the nonlinear element either loses its directional characteristic, which removes the nonlinear behavior, or on the other hand, it may break up and become an open circuit, resulting in the passage of no current at all in the electrical conductor 27 thereby removing the nonlinear effect originally present due to the nonlinear electrical element 28.

Referring further to FIG. 5A, I may, if I choose, employ a nonlinear element sufficiently durable that it can resist the work of my deactivating device 4 (FIG. 1)

which I provide in the checkout stand area 3 (FIG. 1). In this case, the utilization of my system proceeds through the removal of the contraband marker element of FIG. 5A by the clerk at the checkout stand area 3 (FIG. 1) at the time merchandise is purchased. Otherwise the system functions generally in the same manner as it does in connection with my other contraband marker devices.

In a further modification of my FIG. 5A marker element which I have illustrated as 5B, I provide the same longitudinally extending ferromagnetic element 26, the same electrical conductor 27, extending one or more turns around the girth of the longitudinally extending ferromagnetic element 26 in the vicinity of its equator, but the diode or nonlinear electrical conductor 28 which I afforded in my FIG. 5A is modified (in FIG. 5B) to comprise, instead, two diodes 29 and 30 connected in parallel, and aiding. The two diodes 29 and 30 are disposed differently, the diode 29 having a much larger electric current carrying capacity than the other diode 30. The much larger current capacity of the diode 29 is so chosen that the deactivating device 4 (FIG. 1) operating in the checkout stand area 3 (FIG. 1) cannot cause enough electric current to flow in the conductor 27 to damage the diode 29. On the other hand, the diode 30 which has less current carrying capacity is destroyed. In addition, to cause the electric current delivered by the conductor 27 to be shared in a predetermined manner between diodes 29 and 30, I also provide resistors $R_1$ and $R_2$, each in series with the corresponding diodes 29 and 30.

Figure 5B:
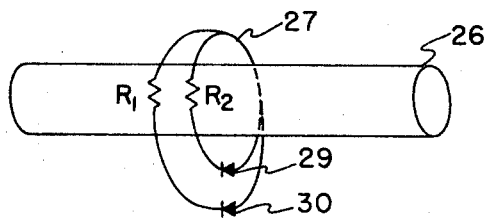

In use, the effect of the modified form 5B marker device is that deactivation between deactivating device 4 (FIG. 1) employed in the checkout stand area 3 (FIG. 1) results in a predetermined and predictable change in the properties of the contraband marker element corresponding with this figure, but leaves it still able to deliver a radiation effect corresponding with modulation products, at the doorway area. Like my other contraband marker corresponding with FIG. 2 this contraband marker element as shown in FIG. 5B affords recognition of stolen merchandise and at the same time affords, at the outgoing doorway, recognition of the fact that contraband marking, in deactivated form, is present on the merchandise being carried by the customer through the outgoing doorway 6 (FIG. 1).

Attention is now directed to the energizing and detecting system 5 (FIG. 1) situated in the outgoing doorway 6 (FIG. 1). Because there are three perpendicular coordinates available in space of three dimensions, two energizing systems and detecting devices can be arranged to work in a non-interacting manner. In fact, it is a characteristic of one embodiment of the invention that within the limits of accuracy of adjustment of the position and orientation of the electromagnetic radiating and receiving components, the two radiating components radiate independently, neither one being capable of transmitting energy into the other one, and further, the detecting or receiving pickup does not receive energy directly from either of the radiating devices. These arrangements of course are valid only when the space in the doorway is empty, there being no contraband marker elements 2 (FIG. 1) in it. This type of arrangement which has been generally recited above is depicted in more detail in FIG. 6.

Figure 6:
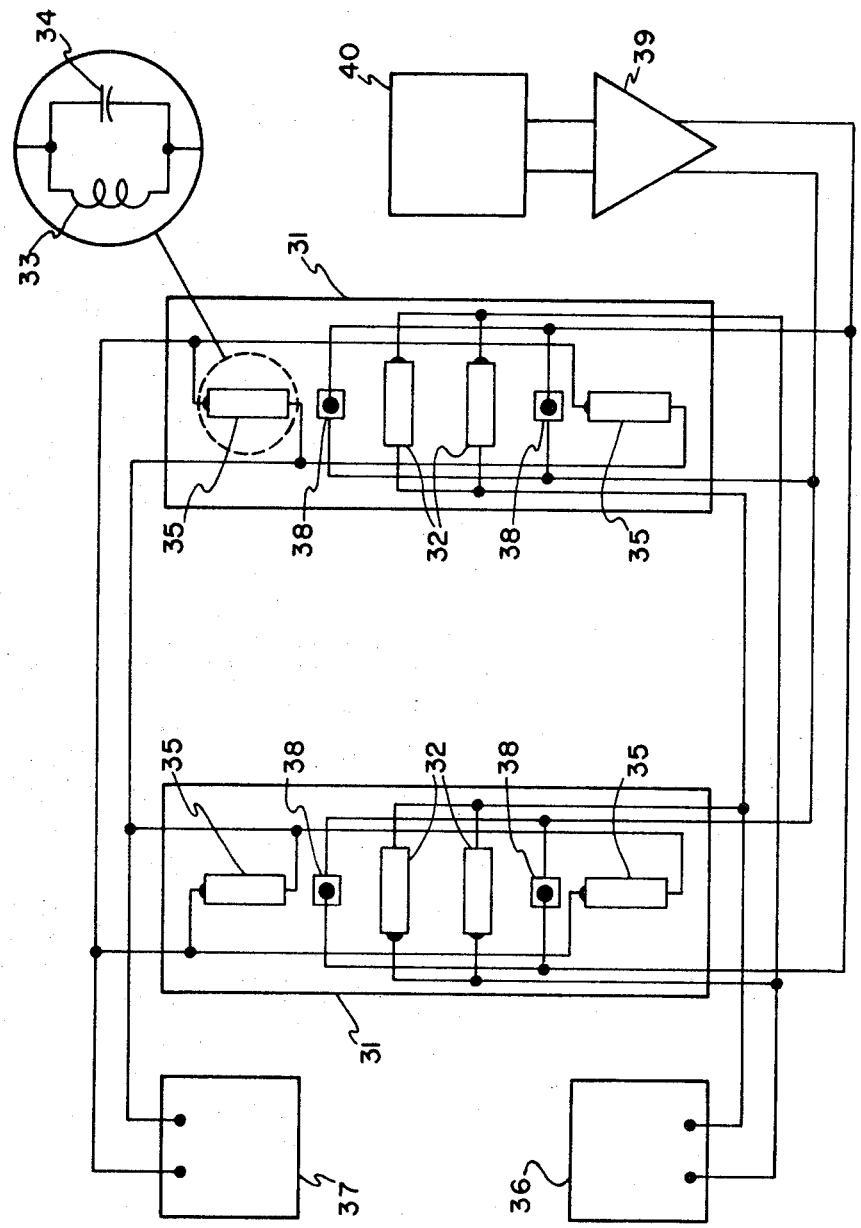
FIG. 6 is a block diagram of an embodiment of an energizing and detecting system for use with the invention.

In FIG. 6 I have pictured two pedestals 31, each containing near its center a pair of sending coils 32. All the sending coils 32 are connected in parallel (or they could have been connected in series). For illustration only, I will suppose that the frequency by which these sending coils 32 are energized is 21 kilohertz. Each such sending coil 32 is separately tuned to exhibit the highest possible impedance at 21 kilohertz. For illustration only, the coils may be composed of 99 turns of No. 20 copper wire wound on a one inch diameter coil form in a single layer to produce 99 turns in a total length of 3½ inches. Such a coil may be resonated to 21 kilohertz by the use of an electrical capacity of not less than one microfarad and not more than 1.1 microfarad. The combination of one of these coils 33 with its resonating capacitor 34 (as shown in the inset), when energized at the resonant frequency, represents an entirely resistive impedance and in the illustrative case exhibits a resistance between 100 and 150 ohms. A parallel combination of four such resistive loads has a combined effect adapted to efficiently load the voice coil outputs of some available audio amplifiers.

Similarly, there are situated at the bottom and at the top of each of the pedestals 31, coils 35 intended for transmitting another chosen frequency such as (for illustration only) 24.5 kilohertz. The four coils 35 which are intended for 24.5 kilohertz radiation may be constructed similarly and resonated similarly, but, of course, resonate with a correspondingly smaller electrical capacity for each coil. The combination of the first group of four coils 32 is connected to a source of electrical energy 36 at 21 kilohertz. The combination of the second group of four coils 35 is connected to a separate, entirely independent, source of electrical energy 37 at 24.5 kilohertz. Because of the arrangement which I have chosen for the first group of coils 32 and for the second group of coils 35, there is no appreciable mutual inductance acting to deliver 21 kilohertz energy into the 24.5 kilohertz, or vice versa.

At four other locations are presented four more coils 38 with their axes perpendicular to the plane of the paper. Because all the contributions of the first group of four coils 32 and the second group of four coils 35 lie in the plane of the paper, the four coils 38 with their axes perpendicular to the plane of the paper do not receive energy neither at 24.5 kilohertz, nor at 21 kilohertz. The four coils 38 with their axes perpendicular to the paper are resonated at 3.5 kilohertz by choosing an appropriate electrical capacitance. In order to achieve good sensitivity in these coils, and in order that they may be resonated efficiently at the frequency of 3.5 kilohertz, more copper is required in the winding, preferably four layers of No. 20 wire, each layer containing 99 turns more or less. The capacity required to resonate such a coil is in the general vicinity of two microfarads for 3.5 kilohertz.

I call attention to the fact that the cores of these windings have not been specified thus far. It is a preferred choice to wind them on non-magnetic, electrically non-conducting material, for the reason that ferromagnetic material (because of its nonlinear properties) imparts to my system undesirable interactions between the energy sources. Electrically conducting material, on the other hand, destroys the quality of the inductive performance of all the coils. As a matter of fact an air core coil of 99 turns, made in the manner that I have described, has a Q in the vicinity of 500 at 21 kilohertz when wound on a wooden core. The resonance cannot be found, nor the inductance measured well enough to determine the Q if it is wound on an electrical conductor as a core.

The combination of the four coils, as described, with their axes perpendicular to the paper (each coil resonated at 3.5 kilohertz by appropriate electrical capacitance) delivers its output to the ingoing end of a high gain tuned amplifier 39 adapted to selectively receive and amplify electrical signals at 3.5 kilohertz. The amplifier 39 delivers its output to an alarm mechanism 40, or to a carrier frequency module, which is discussed further on. To achieve a closer impedance match with respect to the commonly prevailing input resistance of the amplifiers that are the most convenient, I may choose to vary from the connections shown in FIG. 8, and connect the four receiving coils 38 (the ones with their axes perpendicular to the paper) in series. The resistive component of these coils (with their resonators connected) comes out for each such resonated system in the vicinity of 100 ohms, with the result that the series of four of them are a close match to the communications impedance figure of 500 ohms, a common choice for amplifiers, filters, etc.

Figure 7:
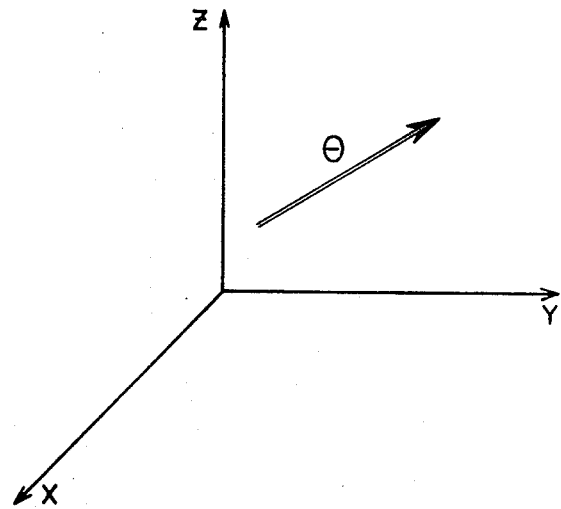
FIG. 7 is a diagram to assist in the explanation of the operation of the energizing and detecting system.

I turn now to FIG. 7 presented for the purpose of diagrammatically assisting in the explanation of the manner of functioning of the energizing and detecting system 5 (FIG. 1) which I have particularly detailed and described in connection with FIG. 6. In FIG. 7 the axis X may be taken to represent the action of the 21 kilohertz radiator, the perpendicular axis Y illustrates the action of the 24.5 kilohertz radiator, and the axis represents the receiving sensitivity or direction of the 3.5 kilohertz receiving coils 38 of FIG. 6. The vector $\theta$ is illustrated in a direction not parallel to nor perpendicular to any of the three axes. The vector $\theta$ represents the direction in which a contraband marker element 2 (FIG. 1) is capable of receiving and re-radiating energy. Because the vector $\theta$ has an appreciable component in all three axes, the contraband marker element 2 (FIG. 1) oriented in accord with this vector is able to receive energy concurrently at 21 kilohertz, and likewise at 24.5 kilohertz. For similar reasons, if the contraband marker element 2 (FIG. 1) re-radiates at 3.5 kilohertz (not being deactivated) then detection axis Z is so directed with respect to the vector $\theta$ that the said detection system is not insensitive to radiation emitted by the contraband marker element 2 (FIG. 1).

The user, considering the information presented in connection with FIG. 6, and the information just presented in connection with FIG. 7, will realize that the reception of a 3.5 kilohertz in my system is a distinctive and an exclusive evidence of the presence of contraband marker elements 2. (FIG. 1). One or more such elements must be in the domain of energy radiation and sensitivity provided by the arrangements shown in FIG. 6 to deliver a 3.5 kilohertz signal. Other entities than contraband marker elements are not entirely without effect, but they do not present the same effects.

To aid the understanding of another modification of my system which I have described, I turn again to FIG. 7. In FIG. 7 I have represented the directions of action of the energy source frequencies X and Y (21 and 24.5 kilohertz sources) and the direction of sensitivity of the system that detects the difference tone Z in the form of three perpendicular axes. To the worker skilled in the art, it is evident that if contraband vector $\theta$ is exactly perpendicular to either of the signal source axes X or Y, energy is eliminated which corresponds with the vector to which the vector $\theta$ is perpendicular. Furthermore, if the vector $\theta$ lies in the X — Y plane, it is perpendicular at all times to the axes Z which therefore prohibits the reception of any energy in the signal receiving system 38, (FIG. 6). It is, in fact, true that the vector $\theta$ must have appreciable and comparable components or direction cosines aligned with all three of the vectors X, Y, and Z. For those directions $\theta$ which do not fulfill these conditions, either the difference tone signals are not produced or they are not observed (if produced) by the contraband marker element 2 (FIG. 1). The fact that there are so many blind spots and so many requirements on the direction of contraband, causes the system, conceived as in the foregoing, to sometimes fail to recognize contraband markers passing through the outgoing doorway 6 (FIG. 1). It still remains a fact that nothing other than a contraband marker will ring the alarm. However, a way has been discovered to reduce the inconvenience resulting from the above noted limitations (which now and then permit a contraband marked piece of stolen merchandise to get through).

The user will note in FIG. 6 that in the foregoing the energy from the 21 kilohertz source has been excluded from the 24.5 kilohertz source by arranging for separate radiators, and arranging that these be non-interacting because of their perpendicularity arrangement. Another approach to excluding wrong pathways of signal energy is quite applicable in the frequency range which I have chosen, an approach not dependent on geometry. My modification permits advantages in the simplification of the doorway structure.

The system which is contemplated for the reduction of the number of blind spots in respect to the direction of the vector $\theta$ (FIG. 7) substitutes rigorously designed wave filters, containing passive elements only. These perform the function performed by the geometric isolation in the system of FIG. 6. Such wave filters can be designed for the range of frequency in the vicinity of 20 to 50 kilohertz without the use of ferromagnetic material or anything else which would impose a nonlinearity. The wave filters thus used, if provided in a sufficient number of sections, propagate the desired energy substantially without loss and are able to reject the unwanted signal frequencies to whatever extent is desired, through the use of a sufficient number of networks. A properly designed M or $\pi$ derived filter network will exclude unwanted frequencies by over one hundred decibels in just a few networks.

Lattice type filters may be employed for single frequency rejection and are extremely effective. In fact, the only serious limitation on the rejection brought about by a lattice type filter is imposed by variation in frequency of the signal which it is desired to reject. A lattice type filter, for example, may comprise two electrical capacitances and two inductive elements as the four components of a bridge. The input to the bridge and the output to the bridge have a ratio which theoretically is infinite at the frequency at which it balances. Thus it is theoretically possible to exclude a single frequency to any extent, by a single network of such a filter. At the same time a single network lattice filter can transmit very efficiently energy corresponding with signal frequencies that are substantially different from the signal frequency at which the bridge balances.

For 20 kilohertz or more, substantially perfect inductances (inductances with a Q in the realm of thousands) can be delivered in the space of a few cubic inches, and need not contain more than an ounce or two of copper wire. Again, in the frequency spectrum involving a metal box comprised of iron or copper, and with a coil spaced from the walls, inside the box, the coil neither radiates nor absorbs electromagnetic energy appreciably in this kilohertz range. Capacitances constructed of aluminum foil and wound with such a dielectric as wax paper (or mylar or polystyrene) gives a substantially perfect electrical performance in my preferred frequency range. It is, accordingly, entirely feasible to contemplate the substitution of rigorous filtering in place of the previously described geometric means of arranging radiator coils so that energy is not transferred from one system to another. Moreover, the use of well designed filters has a further advantage, that the presence of conducting bodies of any description in the doorway 6 (FIG. 1) does not cause energy to flow from one system to the other, since the wave filters function independently of whatever bodies are situated in the doorway 6 (FIG. 1). On the contrary, the geometric arrangement of coils is sensitive to the presence of electrically conducting bodies in the doorway 6 (FIG. 1) and the favorable results which is achieved by making these coils 32, 35, and 38 (FIG. 6) perpendicular are partly destroyed whenever a large electrically conducting body passes through the outgoing doorway 6 (FIG. 1).

Figure 8:
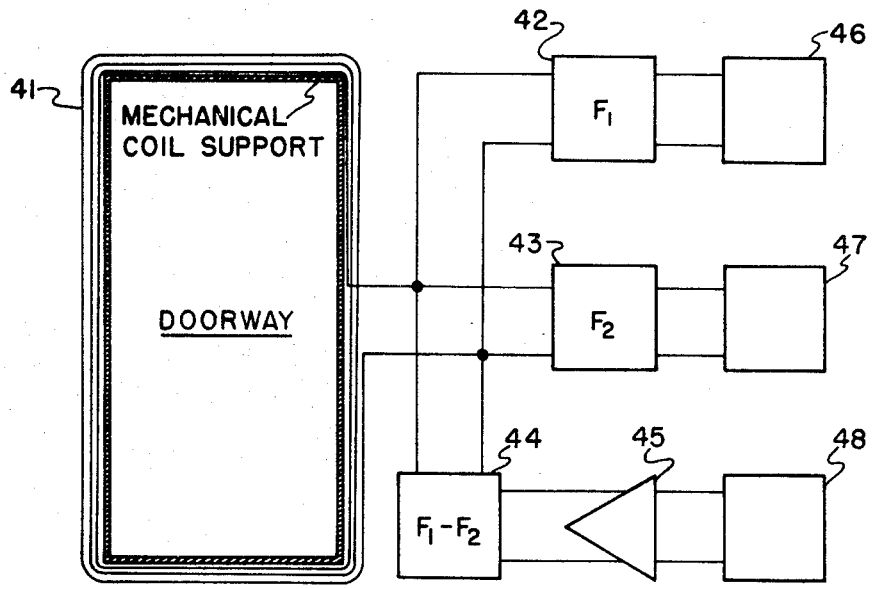
FIG. 8 is a diagram of a filter and coil system for use with the marker of the invention.

I turn now to FIG. 8 which illustrates the plan comprised in a general way in the foregoing discussion. In FIG. 8, for simplicity I illustrate one common radiating and receiving means 41, and one only, since this shows the flexibility of my modified plan most clearly. In the block diagram, the user will note that there are provided three distinct wave filters, each connected at its input to a separate electrical entity. The electrical entity to which the first two wave filters are connected is in each instance an oscillator. For convenience, the filters 42 and 43 are also designed by the symbol $F_1$ and $F_2$ to indicate the center of a pass band which each of the said filters 42 and 43 selectively transmits. The third filter 44 is designated by the symbol $F_1 - F_2$ to indicate the fact that the center of its pass band is chosen at the difference frequencies corresponding with the difference between the two frequencies $F_1$ and $F_2$. The filters in question are deliberately taken from designs which permit extremely strong selectivity and extremely high exclusion of the unwanted frequencies.

As an example of a frequency corresponding with a capability of extremely strong filtering, $F_1$ may be 31 kilohertz, $F_2$ may be 21 kilohertz, and $F_1 - F_2$, in fact, 10 kilohertz. These frequencies can be very stringently filtered against one another and, in fact, exclusivity can be achieved to whatever extent is required. I therefore indicate these entities as being each connected to a single electronic device in the doorway detecting and energizing system 41. A suitable doorway sensing and detecting device 41 adapted for the purpose is a flat wound coil 41 diagrammatically shown in FIG. 10. Such a flat wound coil serves effectively because the two input energy sources 46 and 47 cause a concurrent influence on the contraband at the frequencies $F_1$ and $F_2$ whenever a contraband element has a significant component of its vector $\theta$ in a direction not in the plane of the coil. In a completely reciprocal manner, the illustrated doorway coil 42 is able to receive energy at the difference tone $F_1 - F_2$ with good efficiency, and can do so whenever the contraband marker element 2 (FIG. 1) exhibits an appreciable component perpendicular to the plane of the doorway (shown in FIG. 8) (at the time the contraband element 2 [FIG. 1] is passing through the plane of the said doorway).

I refer again to FIG. 8. In this figure it will be noted that there is provided two frequency sources $F_1$ and $F_2$, and two filter systems. It is obvious that if the frequency sources which deliver energy at $F_1$ and $F_2$ are adjusted so that the frequency $F_1 = F_2$, and furthermore, if I impose the requirement that these two alternating current energy sources be in phase, then, in this degenerate case, the entire system comprising the frequency sources delivering energy at the two frequencies $F_1$ and $F_2$ has the same effect as one oscillator and one filter. Accordingly therefore I achieve the same result if I simply omit the filter $F_1$ and the oscillator 46. In a system comprised by such an omission, since $F_1 = F_2$, the quantity $F_1 - F_2$ has no significance as alternating current for the reason that $F_1 - F_2$ equals zero. However, in modulation products, as has been stated, earlier, one of the functions that is generated is $F_1 + F_2$. For the case in which $F_1 = F_2$, $F_1 + F_2$ is of course 2F.

In the modification of the system which I am now describing with the help of FIG. 8, the oscillator 46 and the filter 42 are omitted. I provide the substitution of a filter adapted to pass the frequency $2F_1$ instead of a filter 44 (as illustrated) to pass the frequency $F_1 - F_2$. The recognition of contraband marked merchandise by this modified system is identically the same as has been described in the other embodiments of my invention. From an engineering standpoint it is required that the filter 43 of FIG. 8, be adapted to particularly stringent rejection of the frequency 2F. In a lattice filter designed for single frequency rejection elimination of the unwanted frequency $2F_1$ from the output of this filter can be accomplished to more than 100 decibels in two meshes, providing the stability of the frequency of the oscillator 47 is sufficiently good. This is easily arranged by employing crystal control to stabilize the oscillator 47. I envision the use of a temperature insensitive cut of the quartz crystal and, if necessary, I employ a temperature controlled environment to further improve the frequency stability of the oscillator 47. The stability of oscillators has been controlled within one part per bilion over long periods by the careful use of these techniques. Since I do not need such extreme frequency control, the adequacy of the methods which I propose is quite obvious.

In the use of my anti-shoplifting systems there is a problem of communicating the warning signal indicating that merchandise is being stolen, and bringing the indication to the attention of security guards who are not, necessarily, at the same place. To make this procedure convenient in finished buildings where the wiring is already in place, I propose the use of ordinary carrier frequency signaling techniques that are well known in the art, and proposed that the carrier frequency signals be inserted on the electric power system.

Since my warning devices are electrically powered, it is convenient to insert the carrier warning signal on the cord through which the power requirements of the system are served, making communications connections of a separate nature unnecessary. The electronic equipment necessary to put the carrier frequency warning message into the power cord will generally be a part of, or will be situated close to the other parts of the antishoplifting system. In fact all these things may be on the same panel rack or may be built up in the same stack of shielded boxes, as proves convenient. I visualize such carrier frequency systems as a valuable and useful feature in combination with the other elements of my invention. In FIG. 8, the carrier frequency module, is as desired, the element 48.

In FIG. 8 the operator will note that there are six electrical connections, comprising three pairs, going from the systems: (a) 46 and 42, (b) 47 and 43, and (c) 48 and 45. U.S. Pat. No. 2,520,677 (Aug. 29, 1950) makes a similar use of six wires in the form of three pairs, and provides an especially effective means for filtering out the noise from the signal frequency $F_1 \pm F_2$ ($F_1 = F_2$, is used in the discussion in this patent application). I contemplate the use of all the same means and methods for improving the signal to noise ratio in this antishoplifting system, and employ the same in combination with the other features of my anti-shoplifting system to better reject unwanted noise and electrical disturbances of all kinds.

I refer one more to FIG. 8, and particularly I employ the device of FIG. 8 with the omission of elements 43, 44, 45, 47 and 48. I further describe the filter $F_1$ (element 42) as a non-significant component comprised in this use of FIG. 8 device as simply a pair of wires going straight through from left to right. In effect I omit the function of this filter. In this use of the FIG. 8 device I also construe the oscillator 46 as one emitting relatively very strong electrical oscillations, and one which may at times be adjusted or at least have its frequency reset to another value as required. Further the oscillator 46 may be a "warble" oscillator adapted to cyclically retraverse a small range of frequency.

In the use which I am now describing for the FIG. 8 device, I insert the coil identified in FIG. 8 as "doorway" at the point shown for the device 4 in FIG. 1. The coil 41 is assumed to be taken to a proper scale so that it will fit in the space provided at location 4 in FIG. 1. My FIG. 8 device so arranged is, in fact, suitable to perform the deactivating function. To assure the upward radiation of a strong electromagnetic effect through the belt 2A of the checkout stand 3 shown in FIG. 1, I arrange the design of the checkout stand so that there are no closed metallic loops between the device 4 and the merchandise 1 with contraband marker 2. I further designate that the plane of my FIG. 8 coil 41 will be the same as the plane of the largest side of the box shaped space designated at numeral 4 in FIG. 1. For this use, and for all the other uses of the FIG. 8 device, it is understood that the mechanical coil support which is illustrated in FIG. 8 is an electrically non-conducting material, and a non-ferromagnetic material.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A marker for being secured to an object to enable detection of the object within an interrogation zone having an oscillating electromagnetic field, the marker comprising:

a generally ring-shaped electrical conductor including a loop having a pair of ends which do not close for carrying a current induced by said electromagnetic field, and a ferromagnetic substance which is nonlinearly polarized in response to said electromagnetic field and is electrically connected to the ends of said conductor, wherein said marker radiates detectable electromagnetic radiation at a predetermined frequency when disposed within said interrogation zone.

2. A marker according to claim 1 wherein said substance comprises barium titanate.

3. A marker for being secured to an object to enable detection of the object within an interrogation zone having an oscillating electromagnetic field, the marker comprising:

a generally ring-shaped electrical conductor for carrying a current induced by said electromagnetic field, a substance which is nonlinearly polarized in response to said electromagnetic field and is electrically connected to said conductor, wherein said marker radiates detectable electromagnetic radiation at a predetermined frequency when disposed within said interrogation zone, and the conductivity of a segment of said ring-shaped conductor being degradable by a predetermined current flow therethrough to permit deactivation of said marker by inducing said predetermined current in said conductor.

4. A marker according to claim 3 wherein said segment comprises a substance of lower conductivity than the remainder of said conductor.

5. A marker according to claim 3 wherein said segment comprises a constriction in said conductor.

6. A system for detecting an object in an interrogation zone comprising:

means proximate the area for producing at least one oscillating electromagnetic field in the zone, a marker associated with each object to be detected for reflecting detectable electromagnetic radiation in response to energy received from said oscillating electromagnetic field, said marker including a ring-shaped electrical conductor for carrying a current induced by said electromagnetic field, and further including a substance which is nonlinearly polarized in response to an electromagnetic field and which is connected to said conductor, means for sensing reflected electromagnetic radiation from said marker in said interrogation zone, and means for deactivating said marker to permit an authorized passage of an object through the zone without detection.

7. A system according to claim 6 wherein said deactivating means comprises:

an electromagnetic energy source for producing electromagnetic energy corresponding with the frequency of mechanical resonance of said marker for fracturing said marker.

8. A system according to claim 6 wherein said marker includes a segment having a conductivity lower than the conductivity of the remainder of the conductor and wherein said deactivating means comprises means for inducing in said conductor enough current to destroy the electrical conductivity of said segment.

9. A method of detecting an object in an interrogation zone comprising the steps of:

providing each object to be detected with a marker comprising a ring-shaped electrical conductor for carrying a current induced by an electromagnetic field the lines of which link said conductor, and a substance connected to the conductor and which is nonlinearly polarized in response to an electromagnetic field, producing an oscillating electromagnetic field in the interrogation zone to induce a current in the conductor of a marker present in the zone to radiate detectable electromagnetic radiation, detecting in the interrogation zone said radiation, and selectively deactivating said marker when it is not desired to indicate the presence of an object in the interrogation zone.

10. A marker for being secured to an object to enable detection of the object within an interrogation zone having an oscillating electromagnetic field, the marker comprising:

a generally ring-shaped electrical conductor comprising a short-circuited loop for carrying a current induced by said electromagnetic field, and a ferromagnetic material of low coercive force formed about said conductor, said ferromagnetic material being nonlinearly polarized in response to said electromagnetic field wherein said marker radiates detectable electromagnetic radiation at a predetermined frequency when disposed within said interrogation zone.

11. A marker for being secured to an object to enable detection of the object within an interrogation zone having an oscillating electromagnetic field, the marker comprising:

an electrical conductor comprising a loop having a pair of spaced apart ends for carrying a current induced by said electromagnetic field, a nonlinearly polarized material electrically connecting the ends of said loop such that said marker radiates electromagnetic radiation when disposed within said interrogation zone, and ferromagnetic material disposed about the outer periphery of said loop to increase the inductance of said loop, wherein said marker radiates a resonance frequency when placed within said interrogation zone.

12. A marker for being secured to an object to enable detection of the object within an interrogation zone having an electromagnetic field, the marker comprising:

an electrical conductor for carrying a current induced by said electromagnetic field, a wire disposed around said conductor, and a nonlinearly polarized rectifier junction connected at each end to said wire wherein said marker radiates electromagnetic radiation when disposed within said interrogation zone.

13. A system for detecting an object in an interrogation zone comprising:

means proximate the area for producing at least one oscillating electromagnetic field in the zone, a marker associated with each object to be detected for reflecting detectable electromagnetic radiation in response to energy received from said oscillating electromagnetic field, said marker including a ring-shaped electrical conductor for carrying a current induced by said electromagnetic field, and further including barium titanate which is nonlinearly polarized in response to an electromagnetic field and which is connected to said conductor, and means for sensing reflected electromagnetic radiation from said marker in said interrogation zone.

* * * * *

Notice of Adverse Decision in Interference

In Interference No. 98,962 involving Patent No. 3,754,226, E. R. Fearon, CONDUCTIVE-RING FERROMAGNETIC MARKER AND METHOD AND SYSTEM FOR USING SAME, final judgment adverse to the patentee was rendered Dec. 23, 1975, as to claims 3, 4, 6, 8 and 9.

[*Official Gazette March 23, 1976.*]